July 30, 1929.  J. BATH  1,722,834
INTERNAL MICROMETER GAUGE
Filed April 4, 1927
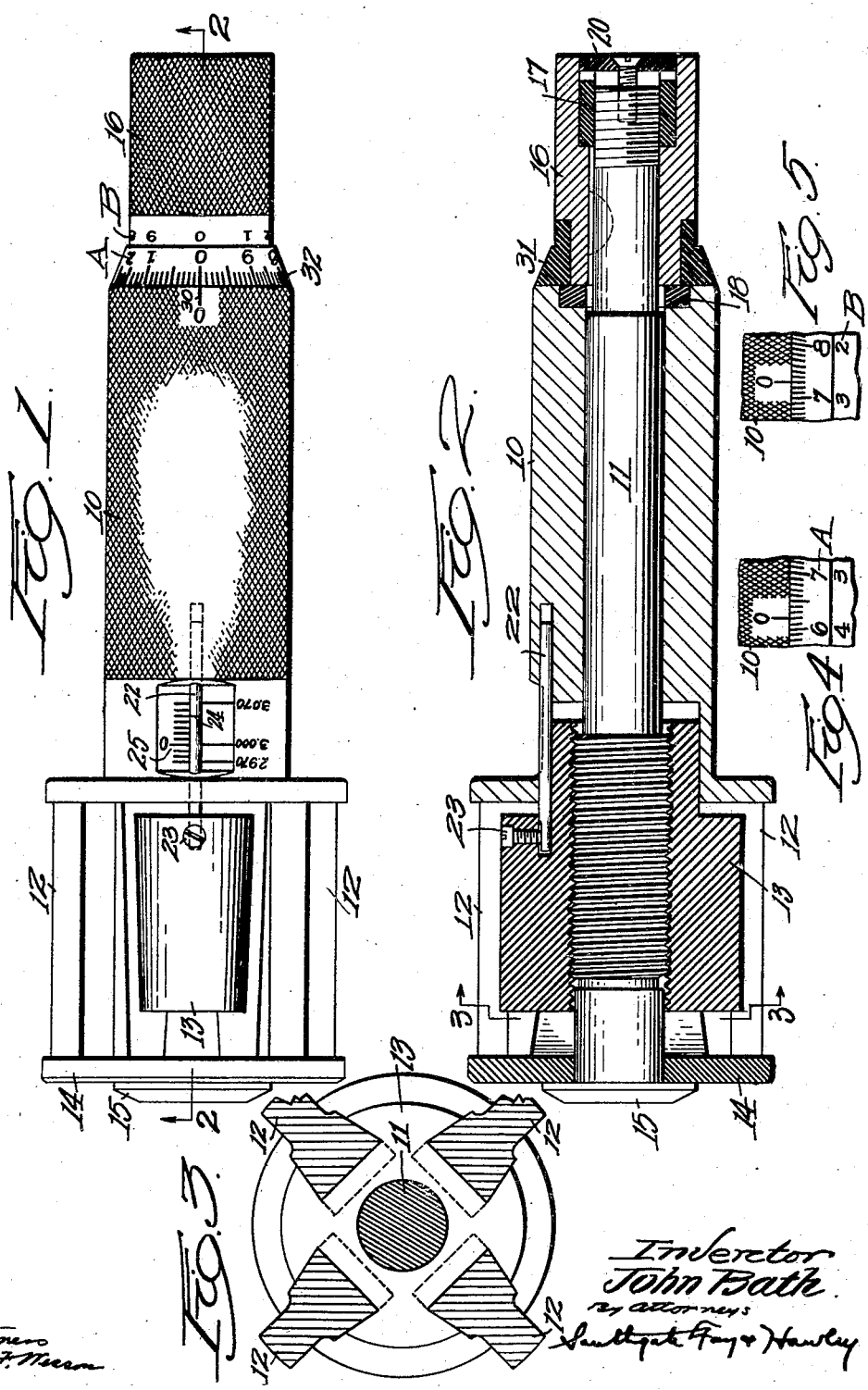
Inventor
John Bath
by attorneys Patented July 30, 1929.

1,722,834

UNITED STATES PATENT OFFICE.

JOHN BATH, OF WORCESTER, MASSACHUSETTS.

INTERNAL-MICROMETER GAUGE.

Application filed April 4, 1927. Serial No. 180,740.

This invention relates to a micrometer gauge, and particularly to a gauge used for measuring internal diameters.

These internal micrometer gauges are very frequently used simply to determine the variation either above or below a fixed standard size, and it is the general object of my invention to facilitate the taking of such variation readings, and to reduce the liability of error in taking such readings.

With this general object in view, my invention relates particularly to the provision of improved size indicating devices by which a variation reading either above or below standard size may be taken directly and without mental computation.

My invention further relates to arrangements and combinations of parts which will be hereinafter described and more particularly pointed out in the appended claim.

A preferred form of the invention is shown in the drawings in which

Fig. 1 is a side elevation of my improved gauge;

Fig. 2 is a sectional plan view, taken along the line 2—2 in Fig. 1;

Fig. 3 is a sectional end elevation, taken along the line 3—3 in Fig. 2; and

Figs. 4 and 5 are detail views illustrating the manner of reading the gauge.

Referring to the drawings, I have shown a form of internal micrometer gauge comprising a body 10 having a threaded rod 11 rotatably mounted therein. A plurality of gauge bars 12 are mounted in dove-tailed bearings in a supporting member 13 which is internally threaded to receive the threaded rod 11. The inner bearing surface of each gauge bar is inclined with respect to the axis of the gauge and engages a correspondingly inclined bearing surface in a dove-tail recess in the supporting member 13. A plate or disc 14 is mounted on the outer end of the rod 11, and is held in position by the enlarged head 15 of said rod, holding the gauge bars from axial movement relative to the handle or body 10.

At the handle end of the rod, a sleeve 16 is keyed to the rod, and is adjusted axially by a nut 17, seated in a recess in said sleeve and threaded on the reduced end of the rod 11. A wear-resisting collar 18 is seated in the end of the body 10 and is engaged by the inner end of the sleeve 16. By turning the nut 17 within the sleeve 16, the parts may be drawn firmly together, so that they are freely rotatable but that endwise movement thereof is substantially eliminated. A plate 20 may be inserted in the end of the sleeve 16 to exclude dust and preserve the adjustment if so desired. As the threaded rod 11 is rotated in fixed axial position, the supporting member 13 is moved axially relative to the gauge bars which are held from axial movement by the plate 14. This causes radial movement of the gauge bars, increasing or decreasing the diameter of the gauge.

A rod 22 is adjustably secured by a screw 23 in a pocket in the axially movable support 13 and is provided with an index line 24. The rod 22 slides in a recess in the body 10, which is cut away at one side, so that the index line 24 on said rod is clearly visible. A graduated scale 25 is provided on the body adjacent the path of movement of the index line 24 on the rod 22. This scale and index are used for indicating the larger size divisions, such as hundredths of an inch. The rod 22 also serves to prevent relative angular movement between the supporting member 13 and the body 10.

An index or zero line 30 is provided at the handle end of the body 10, and a graduated sleeve 31 is formed on or secured to the sleeve 16 and rotates therewith, adjacent the index line 30. A graduated scale 32 on the member 31 is provided with two sets A and B of numerals, as clearly shown in Fig. 1. One set A of these numerals reads in a clockwise direction, and one set B of numerals reads in the opposite direction. The scale 32 and index 30 are used for finer readings, such as thousandths of an inch and tenths thereof.

Having described the construction of my improved gauge, I will now describe its use and advantages.

We will assume that the gauge is to be used for determining variations in holes which are supposed to be 3.05″ in diameter, as indicated by the index line 24 in Fig. 1. Certain of these holes will be found to be slightly under-size, and certain of them will be slightly over-size. The set of numerals marked A in Fig. 1 are used for direct reading of under-size measurements, while the numerals marked B are used for over-size measurements. For instance, in Fig. 4, I have indicated a setting of the gauge obtained in measuring an under-size hole, and the reading on the scale A indicates directly that the hole is .0062" under-size. In Fig. 5, I have indicated a reading for an over-size hole which indicates that the hole is .0027" over-size.

It will be noted that both of these readings are made directly from the scale 32 and the sets A and B of numerals associated therewith, and that no mental calculation on the part of the operator is necessary to give the correct reading. A very prevalent source of error is thus entirely eliminated, and the time of the operator is saved for more useful purposes.

If any doubt arises as to whether the hole is above or below size, the reading can be readily checked by referring to the scale 25, where the index line 24 will appear displaced in one direction or the other with reference to the standard reading on the selected line of the scale 25.

Having thus described my invention and the advantages thereof, I do not wish to be limited to the details herein disclosed, otherwise than as set forth in the claim. What I claim is:—

In an internal micrometer gauge, an elongated body, a plurality of radially movable gauge bars with dove-tailed bearing portions and inner bearing faces inclined with respect to the axis of the gauge, means to hold said bars from axial movement in said gauge, a support for said gauge bars having a plurality of correspondingly inclined bearing recesses for said gauge bars, means to hold said supporting member from angular movement in said gauge, an actuating rod mounted in said body and threaded in said support, means to hold said actuating rod from axial movement in said body, a device for indicating larger units of gauge bar adjustment, and means to indicate smaller units of gauge bar adjustment, said latter means comprising an index on said body, and a graduated member mounted on said rod and rotatable therewith adjacent said index and having a series of graduations thereon numbered in one direction for direct reading of under-size variations, and numbered in the opposite direction for direct reading of oversize variations.

In testimony whereof I have hereunto affixed my signature.

JOHN BATH.